March 19, 1957  R. Y. MINER ET AL  2,785,857
RANGE COMPUTING APPARATUS
Filed Nov. 10, 1949
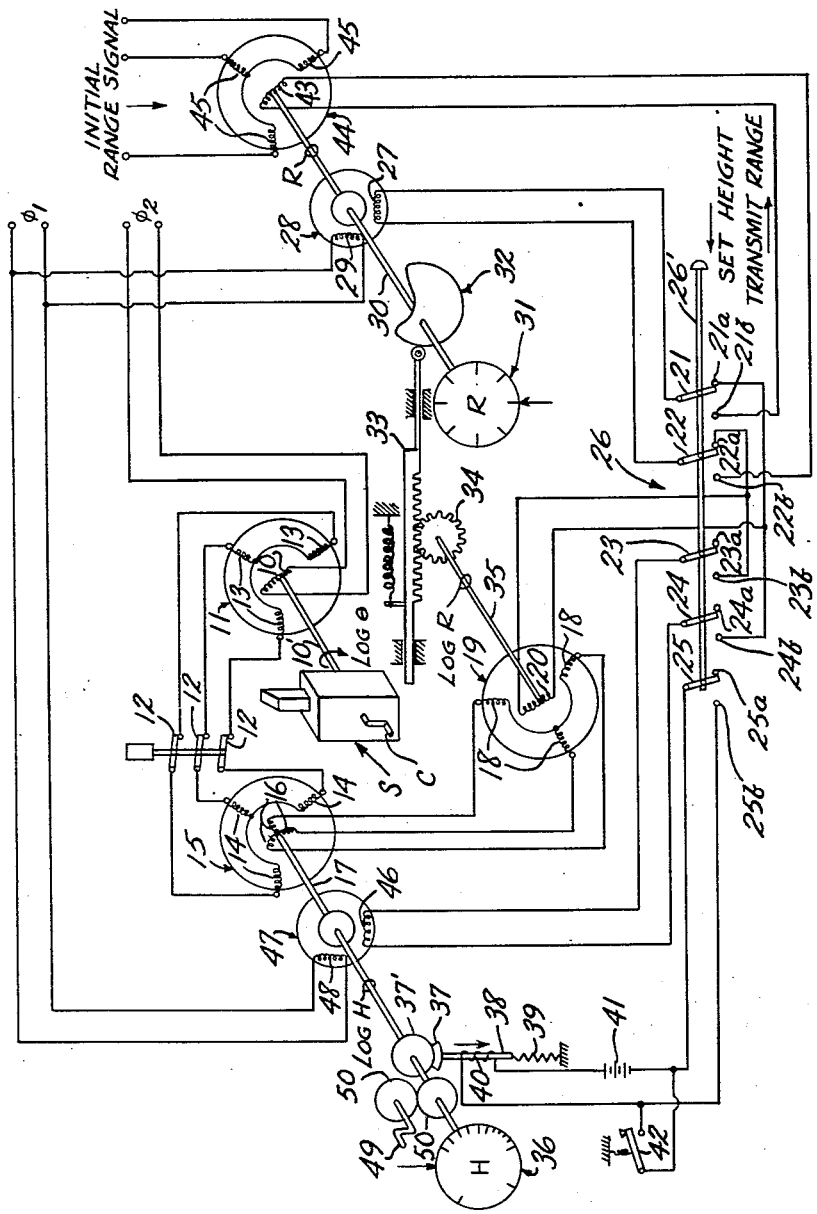
INVENTORS
RICHARD Y. MINER &
QUENTIN J. EVANS
BY
Their ATTORNEYS

United States Patent Office 2,785,857
Patented Mar. 19, 1957

2,785,857

RANGE COMPUTING APPARATUS

Richard Y. Miner and Quentin J. Evans, New York, N. Y., assignors to American Bosch Arma Corporation Application November 10, 1949, Serial No. 126,636

12 Claims. (Cl. 235—61.5)

This invention relates to computing apparatus, and has particular reference to apparatus for automatically calculating the range to a distant object from mechanical inputs of known height of the distant object, such as a target, and measurement of the vertical angle subtended at the observation point by the height of the object.

In the periscope type of stadimeter for measuring vertical angles, i. e., the vertical angle included between the lines of sight to the base and the summit of a remote object, the periscope is actuated by manual rotation of a shaft to deflect the lines of sight to the base and summit of the object so that they coincide with one another, and the shaft displacement corresponds to the common logarithm of the vertical angle between the lines of sight to the base and the summit of the object. Mechanical means are provided in the stadimeter for obtaining the range to the object and include a logarithmically graduated range scale driven by the stadimeter shaft relatively to a logarithmically graduated height scale, so that the range may be read directly on the scale opposite the proper value of height. Inasmuch as the exposure of the periscope is desirably held to a minimum period in warfare, and the operation is such that the range scale cannot remain at the position indicating the range, the reading is often taken hurriedly and may be considerably in error. Since the range is substantially equal to the height of the object divided by the tangent of the vertical angle which is subtended at the observation point by the height, the range may be mathematically expressed as $$R = \frac{H}{\tan \theta}$$

wherein $R$=range, $H$=height, and $\theta$=vertical angle. Inasmuch as $\theta$ is small, tangent $\theta$ is very nearly equal to $\theta$ in radian measure, so that $$R = \frac{H}{\theta}$$

for using logarithmic notion, log $R$=log $H$—log $\theta$.

In accordance with the present invention, a range computing apparatus is provided, in which the aforementioned equation is utilized to produce a solution of range, R, from a quick reading of a stadimeter by utilizing the stadimeter output of log $\theta$, with range, R, being directly indicated on a linearly graduated scale which is stopped at the instant that the periscope stadimeter is correctly trained on the target height.

In a preferred embodiment of the range computing apparatus of this invention, the rotor of a self-synchronous generator is driven by the stadimeter output shaft through an angle corresponding to log $\theta$ and the voltage output of the stator windings of the generator are impressed on the stator windings of a self-synchronous differential, whose rotor windings are displaced manually by an amount corresponding to log H to induce voltages in the differential rotor windings which are impressed on the stator windings of the self-synchronous control transformer whose rotor is driven to a non-inductive position by a motor energized by the output of the control transformer, but whose displacement is modified by a logarithmic cam driven by the motor so that the displacement of the cam is proportional to range, R, and the angular displacement of the control transformer rotor corresponds to log R.

Alternatively, the rotor of the self-synchronous differential may be displaced automatically by an amount corresponding to log H in accordance with a radar or other indication of range, R. The control transformer rotor is positioned to log R through the mechanical cam and motor control arrangement wherein the motor is energized by the rotor winding of a second control transformer, the stator windings of which receive a signal corresponding to the range, R. The rotor of the self-synchronous differential is driven by a second motor energized by the rotor winding of the first control transformer, until the signal at the control transformer stator windings corresponds to the displacement of its rotor winding, whence the displacement of the rotor of the differential corresponds to log H as the desired output.

It will be seen that the range computing apparatus of this invention provides an accurate conversion of stadimeter output of log $\theta$ directly into quick and accurate readings of range of distant objects, these readings being provided for instantaneous use in gun fire control and other range- or distance-utilizing computing apparatus.

For a more complete understanding of the invention, reference may be had to the accompanying drawing which is a diagrammatic illustration of the electromechanical range computing apparatus of this invention.

Referring to the drawing, S generally designates a conventional type of periscope stadimeter adapted to be manually actuated by crank C and whose output shaft 10' drives the rotor winding 10 of a conventional self-synchronous generator 11 in accordance with the logarithm of the vertical angle, $\theta$, between the lines of sight to the summit and the base of the distant object, such as a target, which may be a ship, where the base is at the waterline and the summit is the masthead, for example. Rotor winding 10 is energized by $\phi_2$ of the constant alternating voltage supply source.

The three stator windings 13 of the self-synchronous generator 11 are severally connected through 3-pole single-throw switch 12 to the stator windings 14 of a conventional self-synchronous differential 15, whereby the stator windings 14 are energized in accordance with the signals induced in the corresponding stator windings 13 of the self-synchronous generator 11 to create a field for rotor windings 16 mounted on shaft 17.

Shaft 17 is adapted to be rotated manually by means of crank 49 connected to shaft 17 through gears 50. Shaft 17 is normally held locked by brake shoe 37 urged against brake drum 37' by compression spring 39 connected to the free end of brake rod 38, also serving as the armature of solenoid 40 in a circuit including battery 41, and normally open switch 42. When the switch 42 is closed manually, brake 37, 37' is released to allow shaft 17 to be displaced by crank 49 through an angle corresponding to the known height of the distant object set on dial 36, in a manner to be described.

The three Y-connected rotor windings 16 of the self-synchronous differential 15 are electrically connected to the corresponding stator windings 18 of a control transformer 19.

One end of rotor winding 20 of control transformer 19 is electrically connected to terminals 21a and 24b of multiple pole switch 26, and the other end of rotor winding 20 is electrically connected to terminals 22a and 23b of the switch 26 which is manually actuated by means of a single insulated control bar 26'.

Numeral 28 designates a two-phase induction motor having its control field winding 27 electrically connected to movable contacts 21, 22 of switch 26 and its main field winding 29 connected to $\phi_1$ of the alternating voltage supply. The extended rotor shaft 30 of motor 28 carries dial 31, calibrated to directly indicate range, R, and logarithmic cam 32. Cam 32 drives the combined cam follower and rack 33 endwise by an amount corresponding to the logarithm of the displacement of motor shaft 30, and rack 33 drives pinion 34 fixed on the shaft 35 which carries the rotor 20 of the control transformer 19.

It will be observed that with switch 26 in the position shown, all movable contacts 21, 22, 23, 24, 25 lie in the extreme right-hand position in engagement with stationary contacts 21a, 22a, 23a, 24a, 25a, respectively. This right-hand position of switch 26 will be hereinafter called the "transmit range" position. This closure of contacts 21 and 22 of switch 26 accordingly energizes control field winding 27 of motor 28 by the output of rotor winding 20. Motor 28 drives rotor winding 20 of control transformer 19 until the output voltage of rotor winding 20 is zero to deenergize control field winding 27 so that motor 28 stops and the displacement of shaft 35 accordingly corresponds to the displacement of the null field of control transformer 19.

Before describing the operation of the range-computing system just described, it will be helpful to consider the relationship between the logarithm of a number and the displacement of a shaft according to that logarithm, since the displacement of shafts 17 and 35 are based on this theory. Actually, the premise that an angular displacement can be proportional to the logarithm of a given number is incorrect, since the logarithm of zero is minus infinity. However, one decade of logarithms of a variable may be represented by a specific angular displacement so that the angular displacement of a shaft from a defined zero position may be said to correspond to the logarithm of the variable. Specifically, a scale graduated uniformly from zero to unity in K degrees of angular displacement, may represent the common logarithm of all numbers included between top and bottom limits having a ratio equal to 10, such as 10 and 100, 1,000 and 10,000 or .001 and .01, for example. Then for each of these limits the second K degrees of displacement covers the range of numbers from 100 to 1,000, 10,000 to 100,000 and .01 to .1, respectively.

Assuming that in the problem log $R$=log $H$—log $\theta$, H varies between given limits of 10 and 100 feet, R varies between 100 and 100,000 feet and $\theta$ varies between .1 and .001 radians. Inasmuch as one decade of the log of each variable must be covered in equal angular displacements, it follows that the H values are contained in K degrees, R in 3K degrees and $\theta$ in —2K degrees of shaft displacement, while the zero displacements indicate values of $H$=10, $R$=100 and $\theta$=.1. In this manner a shaft displacement corresponds to the logarithm of a given number, and by proper graduation of the displacement indicator, this number can be read directly on the indicator. In the following description of the term "corresponding to log" is to be interpreted as described where "log" designates the common logarithm.

In operation of the range-computing system and beginning with known height (H) of the distant object and with switch 26 in the "transmit range" position shown, the operator closes switch 42 to disengage brake 37, 37' and release shaft 17 for rotation manually by crank 49 through gearing 50 and a clutch arrangement, not shown. Shaft 17 is rotated until known H is indicated directly on the logarithmically graduated dial 36, after which key switch 42 is released to apply brake 37, 37' to prevent further movement of shaft 17.

The target is sighted through the periscope optical system of the stadimeter S which is adjusted by crank C through the vertical angle $\theta$ to the height H of the target, thereby rotating stadimeter output shaft 10' until rotor winding 10 of self-synchrononous generator 11 is displaced by an amount corresponding to log $\theta$. Rotor winding 10 induces position signal voltages in stator windings 13 which are applied through switch 12 to the stator windings 14 of differential 15, thereby creating a field inducing voltages in rotor windings 16 which are applied to the corresponding stator windings 18 of control transformer 19. This differential energization of the stator windings 18 results in angular displacement of the null field of control transformer 19 from its zero position by an amount equal to the difference between the displacements of rotor windings 16 and 10 from their respective zero positions.

The voltage induced in rotor winding 20 of control transformer 19 is applied through 21, 21a and 22, 22a of switch 26 to the control field winding 27 of motor 28 to cause the same to rotate logarithmic cam 32 which in turn rotates rotor winding 20 of control transformer 19 through the agency of rack 33, pinion 34 and shaft 35. When winding 20 is rotated to non-inductive position, motor 28 is deenergized and shaft 35 is displaced by an amount corresponding to log $H$—log $\theta$=log $R$ and shaft 30 is displaced an amount proportional to R, which is read on uniformly graduated dial 31.

At the instant the stadimeter S is set on the target so that log $\theta$ is established, switch 12 is opened manually in order to preserve the solution for R at dial 31.

Considering an illustrative example of an operation of the range-computing system and assuming that one decade of the log of each variable is covered in K degrees of shaft displacement and the zero displacements indicate values of $H$=10, $R$=100 and $\theta$=.1, then the zero position of the shaft 17 corresponds to log 10 (=1.0), the zero position of shaft 10' corresponds to log .1 (=9.0–10) and the zero position of shaft 35 corresponds to log 100 (=2.0). For values of $H$=40 and $\theta$=.05, the mathematical solution for R is 40/.05 or 800.

The mechanical solution for R is derived as follows: the displacement of shaft 17 for a value of $H$=40 is .6021K, since log 40 equals 1.6021, and the displacement of shaft 10' for a value of $\theta$=.05 is —301K, since log .05 equals (8.699–10). By the electromechanical action described previously, the displacement of shaft 35 is .6021K—(—.301K) or .9032K making the mechanized solution for log R equal to 2.9032 whence $R$=800, the same solution as found mathematically above.

In an alternative operation for determining unknown target height H, when only the range is initially known, the computer is put into the "set height" condition by moving shaft 26' of switch 26 to the left, so that movable contactors 21, 22, 23, 24, 25 cooperate with terminals 21b, 22b, 23b, 24b, 25b, respectively. A second control transformer 44 is provided having its rotor winding 43 mounted on shaft 30 and connected to terminals 21b, 22b of switch 26, so that control field winding 27 of motor 28 is energized by the output voltage of this second control transformer 44, the stator windings 45 of which receive a signal derived from $\phi_2$ corresponding to the known range, R. Motor 28 drives shaft 30 until rotor winding 43 of control transformer 44 is aligned with the null field of control transformer 44, so that control field winding 27 is deenergized and motor 28 stops, whereby the displacement of shaft 30 is proportional to R.

A second induction motor 47 also is provided, whose rotor drives shaft 17 and whose control field winding 46 is connected to movable contacts 23, 24 of switch 26 which cooperate with stationary contacts 23b, 24b, so that the output voltage of rotor winding 20 of control transformer 19 energizes the control field winding 46 of induction motor 47, whose main field winding 48 is energized by $\phi_1$ of the alternating voltage supply.

Movable contact 25 in cooperation with terminal 25b energizes brake winding 40 from power supply 41, releasing the brake 37 from shaft 17.

In operation of the system to determine target height H, shaft 10' is displaced by the stadimeter as before by an amount corresponding to log θ and shaft 35 is displaced by an amount corresponding to log R by cam 32 driven by motor 28, so that an output voltage is produced in rotor winding 20 of control transformer 19 when shaft 17 is displaced by an amount other than that corresponding to log H. Motor 47 therefore drives shaft 17 and rotor windings 16 of self-synchronous differential 15 until the signal at stator windings 18 of control transformer 19 corresponds to the displacement of shaft 35, so that the output of rotor winding 20 is zero, whereby the control field winding 46 is deenergized and the displacement of shaft 17 corresponds to log H, and H is directly indicated on dial 36.

Although a preferred embodiment of the invention has been illustrated and described herein, the invention is not limited thereby, but is susceptible of changes in form and detail within the scope of the appended claims.

We claim:

1. In combination with mechanism for determining an elevation measurement of a distant object in terms of a displacement of a member in accordance with said measurement, electrical means responsive to the movement of said member for developing a plurality of voltages in accordance with the displacement of said member, second electrical means having star-connected stator windings energized by said first electrical means and star-connected rotor windings, means for rotating said rotor windings in accordance with the height of said object for changing the voltage in said last-named rotor windings, a transformer having star-connected stator windings energized by the output of said last-named rotor windings and a rotor winding, motive means energized by the voltage induced in said transformer rotor winding, operative connections between said motive means and said transformer rotor winding, and means interposed in said operative connections for modifying the rotation of said transformer rotor winding to non-inductive position by said motive means in accordance with a function of said measurement.

2. In combination with mechanism for determining an elevation measurement of a distant object in terms of a displacement of a member in accordance with said measurement, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, operative connections between said motive means and said transformer rotor winding whereby the said motive means deenergizes itself by rotation of said transformer rotor winding to non-inductive position, and variable motion means interposed in said operative connections for modifying the said rotation of said transformer rotor winding in accordance with a function of said measurement.

3. In combination with mechanism for determining an elevation measurement of a distant object in terms of a displacement of a member in accordance with said measurement, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, operative connections between said motive means and said transformer rotor winding whereby the said motive means deenergizes itself by rotation of said transformer rotor winding to non-inductive position, variable motion means interposed in said operative connections for modifying the said rotation of said transformer rotor winding in accordance with a function of said measurement, and indicating means driven by said motive means.

4. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, operative connections between said transformer rotor winding and said motive means whereby the said motive means deenergizes itself by rotation of said transformer rotor winding to non-inductive position, and logarithmic cam means interposed in said operative connections for modifying the rotation of said transformer rotor winding by said motive means in accordance with the common logarithm of the range of said object.

5. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, operative connections between said transformer rotor winding and said motive means whereby the said motive means deenergizes itself by rotation of said transformer rotor winding to non-inductive position, variable motion means interposed in said operative connections for modifying the rotation of said motive means in accordance with the range to said object, and range indicating means driven by said motive means.

6. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, a cam driven by said motive means, a rack driven by said cam, a pinion driven by said rack, and operative connections between said pinion and said transformer winding to modify the rotation of said motive means in accordance with the range to said object.

7. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, a logarithmic cam driven by said motive means, a rack driven by said cam, a pinion driven by said rack, operative connections between said pinion and said transformer winding to modify the rotation of said motive means in accordance with the range of said object, and indicating means driven by said motive means.

8. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, means for rotating said rotor winding in accordance with the height of said object for changing the voltage in said last-named rotor winding, a lock for holding said rotor winding in said rotated position, a transformer having a stator winding energized by the output of said last-named rotor winding and a rotor winding, motive means energized by the voltage induced in said transformer rotor winding, operative connections between said transformer rotor winding and said motive means whereby the said motive means deenergizes itself by rotation of said transformer rotor winding to non-inductive position, and variable motion means interposed in said operative connections for modifying the rotation of said motive means in accordance with the range to said object.

9. In combination with mechanism for determining the elevation angle of a distant object in terms of a displacement of a member in accordance with the common logarithm of said angle, electrical means responsive to the movement of said member for developing a voltage in accordance with the displacement of said member, second electrical means having a stator winding energized by said first electrical means and a rotor winding, a lock for said rotor winding, means for releasing said lock at will, means for rotating said rotor winding in accordance with the height of said object for changing the voltage in said last-named rotor winding, a transformer having a stator winding energized by the output of said last-named rotor winding and a rotor winding, motive means energized by the voltage induced in said transformer rotor winding, operative connections between said transformer rotor winding and said motive means whereby the said motive means deenergizes itself by rotation of said transformer rotor winding to non-inductive position, and variable motion means interposed in said operative connections for modifying the rotation of said motive means in accordance with the range to said object.

10. In combination with mechanism for determining the elevation of a distant object in terms of a displacement of a member in accordance with the elevation of said object, electrical means responsive to the movement of said member for developing a voltage in accordance with the displacement of said member, second electrical means having a stator winding energized by said first electrical means and a rotor winding, motive means for rotating said rotor winding, a transformer having a stator winding energized by said rotor winding and a rotor winding, electrical connections between said transformer rotor winding and said motive means, a second transformer having a stator winding energized in accordance with the distance to said object and having a rotor winding, second motive means energized by the rotor winding of said second transformer, operative connections between said second motive means and said first transformer rotor winding, operative connections between said second motive means and said second transformer rotor winding whereby the said second motive means deenergizes itself by rotation of said second transformer rotor winding to non-inductive position, and indicating means driven by said first motive means.

11. In combination with mechanism for determining the elevation of a distant object in terms of a displacement of a member in accordance with the elevation of said object, electrical means responsive to the movement of said member for developing a voltage in accordance with the displacement of said member, second electrical means having a stator winding energized by said first electrical means and a rotor winding, motive means for rotating said rotor winding, a transformer having a stator winding energized by said rotor winding and a rotor winding, electrical connections between said transformer rotor winding and said motive means, a second transformer having a stator winding energized in accordance with the distance to said object and having a rotor winding, second motive means energized by the rotor winding of said second transformer, operative connections between said second motive means and said first transformer rotor winding, operative connections between said second motive means and said second transformer rotor winding whereby the said second motive means deenergizes itself by rotation of said second transformer rotor winding to non-inductive position, and means driven by said second motive means for modifying the rotation of said first transformer rotor winding, and indicating means driven by said second motive means.

12. In combination with mechanism for determining the location of a distant object in terms of a displacement of a member in accordance with the elevation of said object, electrical means responsive to the movement of said member for developing a voltage in accordance with the displacement of said member, second electrical means having a stator winding energized by said first electrical means and a rotor winding, motive means for rotating said rotor winding through an angle corresponding to the height of said object for changing the voltage therein, a height indicating dial connected to said rotor winding, a transformer having a stator winding energized by said rotor winding and a rotor winding, electrical connections between said transformer rotor winding and said motive means, a second transformer having a rotor winding and a stator winding, second motive means energized by the rotor winding of said second transformer, operative connections between said second motive means and said second transformer rotor winding whereby the said second motive means deenergizes itself by rotation of said second transformer rotor winding to non-inductive position, a range indicating dial connected to said second motive means, operative connections between said second motive means and said first transformer rotor winding, and switches interposed in the electrical connections between said first transformer rotor windings and both of said motive means for rendering the latter alternatively responsive to energization by said first transformer rotor winding, whereby either the range to said object is indicated on said second dial upon adjustment of said second electrical means rotor winding in accordance with the height of the object for one switch position or the height of said object is indicated on said first dial upon energization of the stator winding of said second transformer in accordance with the range of said object for the other switch position.

References Cited in the file of this patent

UNITED STATES PATENTS

| | | |
|---|---|---|
| 1,998,939 | Mittag | Apr. 23, 1935 |
| 2,428,800 | Holder | Oct. 14, 1947 |
| 2,465,624 | Agins | Mar. 29, 1949 |
| 2,486,781 | Gittens | Nov. 1, 1949 |